United States Patent [19]

Kiilunen

[11] Patent Number: 5,670,073
[45] Date of Patent: Sep. 23, 1997

[54] WATER COOLED GAS METAL ARC WELDING GUN

[75] Inventor: Erik J. Kiilunen, Brighton, Mich.

[73] Assignee: Weld Mold Company, Brighton, Mich.

[21] Appl. No.: 723,100

[22] Filed: Oct. 1, 1996

[51] Int. Cl.[6] ................................... B23K 9/173
[52] U.S. Cl. ........................................ 219/137.62
[58] Field of Search ..................... 219/137.62, 137.2, 219/137.31, 137.42, 136

[56] References Cited

U.S. PATENT DOCUMENTS

| | | | |
|---|---|---|---|
| 2,813,193 | 11/1957 | Bichsel | 219/137.62 |
| 4,667,083 | 5/1987 | Stol | 219/137.62 |
| 5,313,046 | 5/1994 | Zamuner | 219/137.62 |

*Primary Examiner*—Clifford C. Shaw
*Attorney, Agent, or Firm*—Robert G. Mentag

[57] ABSTRACT

A water cooled gas metal arc welding (MIG) gun which is provided with a water cooling system for the gun barrel that introduces the coolant water at the bottom of the barrel to create a coolant water flow through the gun that does not allow the coolant water to stagnate and heat up. The gun includes a water cooled shielding gas cup on the lower end that ensures coolant water flow therethrough, and provides metal thickness at the end of the cup which prevents physical abuse of the cup from affecting the guns' performance. The gun has a shielding gas delivery system which ensures good shielding gas flow and allows for replaceable shielding gas diffusers.

4 Claims, 4 Drawing Sheets

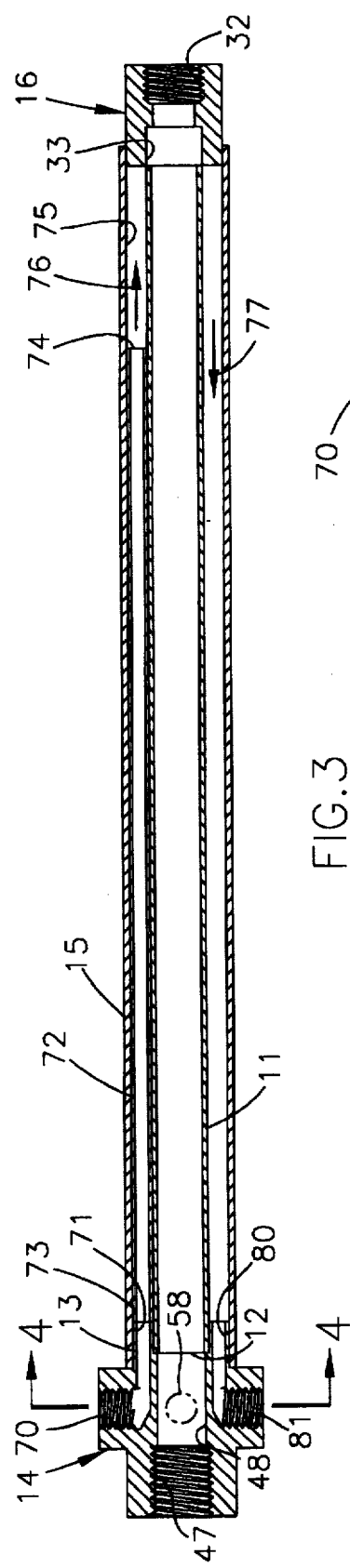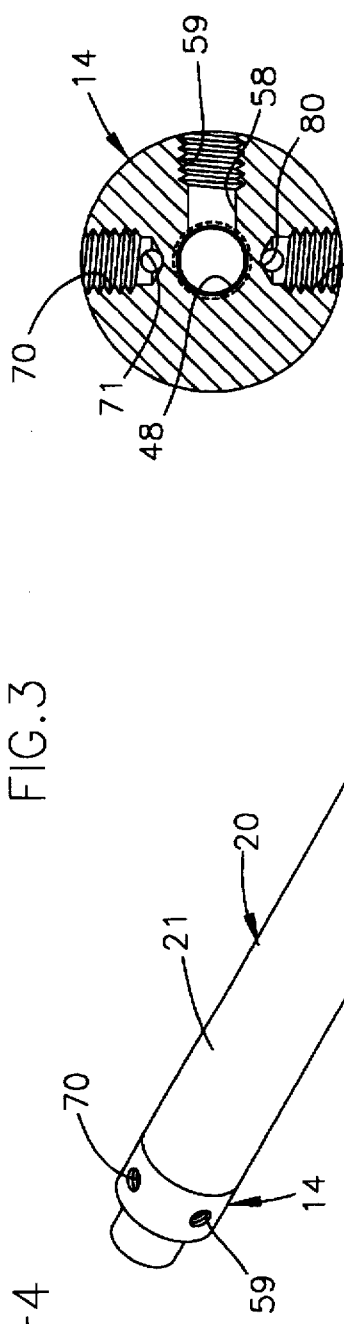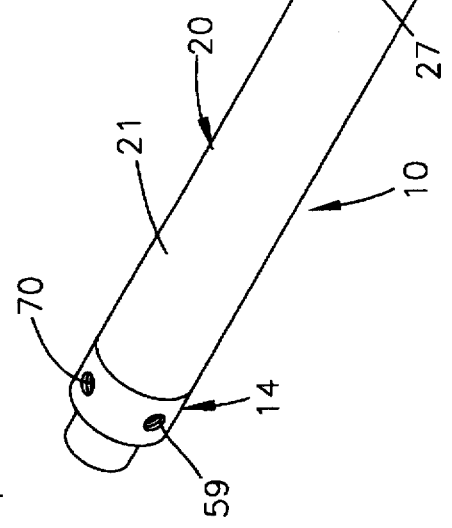

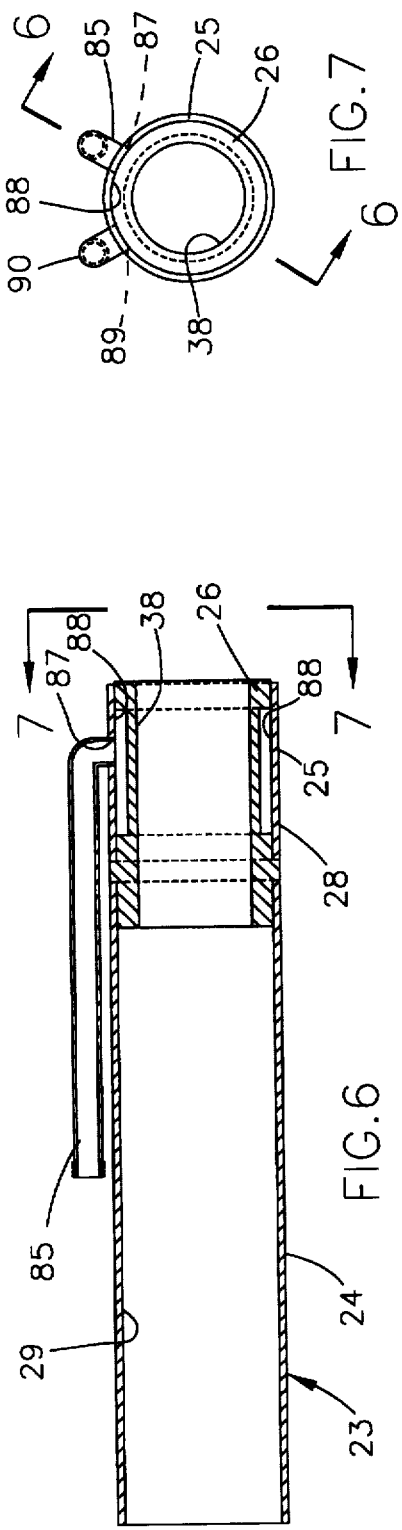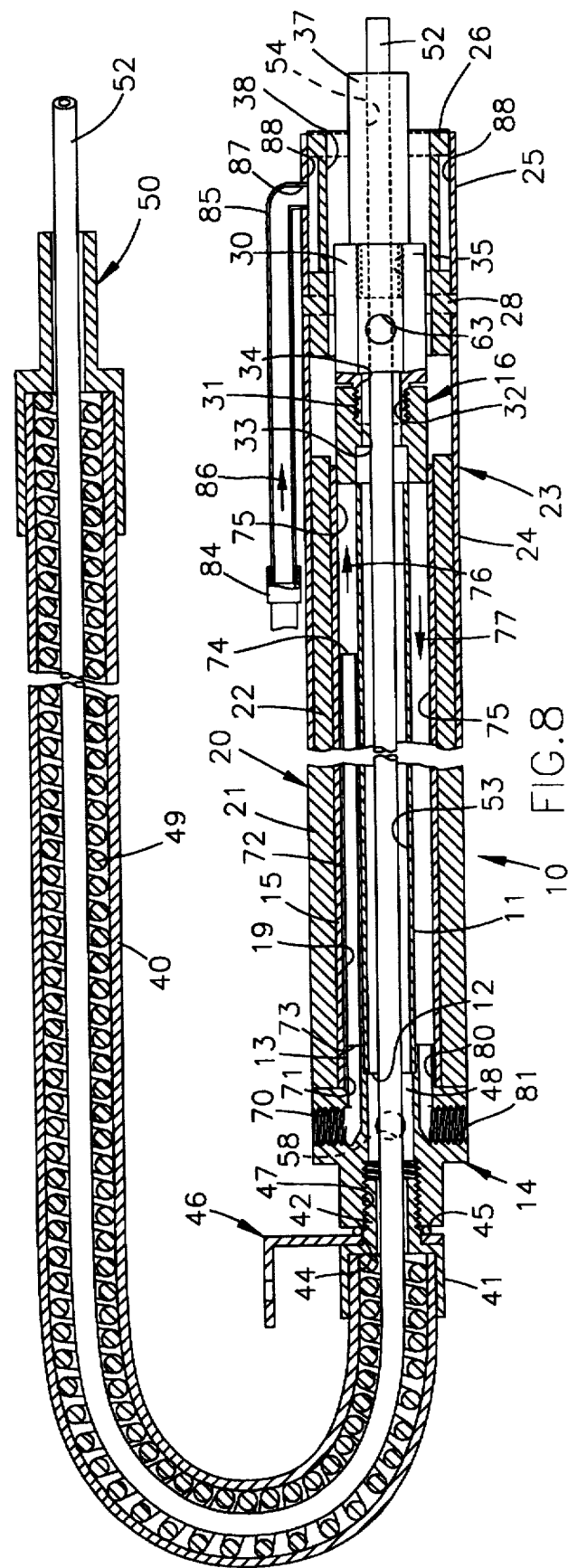

5,670,073

WATER COOLED GAS METAL ARC WELDING GUN

BACKGROUND OF THE INVENTION

1. Field of the Invention

The field of art to which this invention pertains may be generally located in the class of devices relating to electric arc welding. Class 219, Electric Welding, United States Patent Office Classification, appears to be the applicable general area of art to which the subject matter similar to this invention has been classified in the past.

2. Description of the Prior Art

This invention relates generally to the gas metal arc welding (GMAW) art, also referred to as the metal inert gas (MIG) art, and more particularly, to a water cooled MIG welding gun constructed and arranged to handle the extreme temperatures encountered in gas metal arc welding applications.

Heretofore, it has been an extremely difficult problem to use the progressive manual cast welding technique known as "Flood Welding" with flux-cored welding wire. This problem is due to the fact that the equipment to use it has not been capable of withstanding the extreme temperatures of the environment in which this type of welding takes place. The mass of the part being welding is generally heated to 900 degrees Fahrenheit, and the arc temperature of the flux-cored wire used with a MIG gun is between 7,000 degrees Fahrenheit and 10,000 degrees Fahrenheit. The arc and ambient temperatures are within two inches of the end of the MIG gun, and the MIG gun can run continuously for periods of hours. The welding gun equipment on the market today, while capable of doing some of the necessary work has not been able to consistently work without burning up.

SUMMARY OF THE INVENTION

The invention provides a water cooled gas metal arc MIG welding gun which is capable of withstanding the extreme temperatures of the environment in which "flood welding" with flux-cored welding wire takes place. The welding gun of the present invention includes an inner barrel having an axial passage for the conveyance therethrough of flux-cored welding wire which then passes through a shielding gas diffuser and an electrically conductive contact tip. An outer barrel is telescopically mounted around the inner barrel in a radially spaced apart position, to form a cylindrical longitudinal pressurized coolant water passage around the inner barrel. A tubular water cooled cup assembly is mounted on the lower end of the gun, and it surrounds a shielding gas diffuser and a electrically conductive contact tip, and provides a discharge passage to permit shielding gas emitted from the shielding gas diffuser to flow downwardly and outwardly over the welding area. The tubular water cooled cup assembly includes a cylindrical pressurized longitudinal coolant water chamber which is supplied with a coolant water inlet tube and an outlet tube for discharging coolant water after it has moved around and through the cylindrical coolant chamber in the cup assembly.

The pressurized coolant water for the inner barrel is admitted at the bottom of the cylindrical longitudinal coolant passage and it flows upward to prevent the water from stagnating and heating up. The water cooled cup assembly is constructed to ensure optimum coolant water flow, and metal thickness at the lower end of the cup, so that physical abuse of the cup does not affect its performance. The shielding gas system ensures good shielding gas flow and permits quick and easy replacement of the gas diffusers.

BRIEF DESCRIPTION OF THE DRAWINGS

FIG. 3 is a longitudinal section view of the water cooled barrel structure employed in the welding gun illustrated in FIG. 1.

FIG. 4 is a vertical section view of the water cooled barrel structure illustrated in FIG. 3, taken along the line 4—4 thereof, and looking in the direction of the arrows.

FIG. 5 is a perspective view of the water cooled gun barrel structure provided with a barrel insulator and a water cooled cup assembly.

FIG. 6 is a longitudinal section view of the water cooled cup assembly illustrated in FIG. 7, taken along the line 6—6 thereof, and looking in the direction of the arrows.

FIG. 7 is a right end view of the water cooled cup assembly structure illustrated in FIG. 6, taken along the line 7—7 thereof, and looking in the direction of the arrows.

FIG. 8 is a longitudinal section view of the assembled structure of the welding gun of the present invention.

DESCRIPTION OF THE PREFERRED EMBODIMENT

Figure 1:
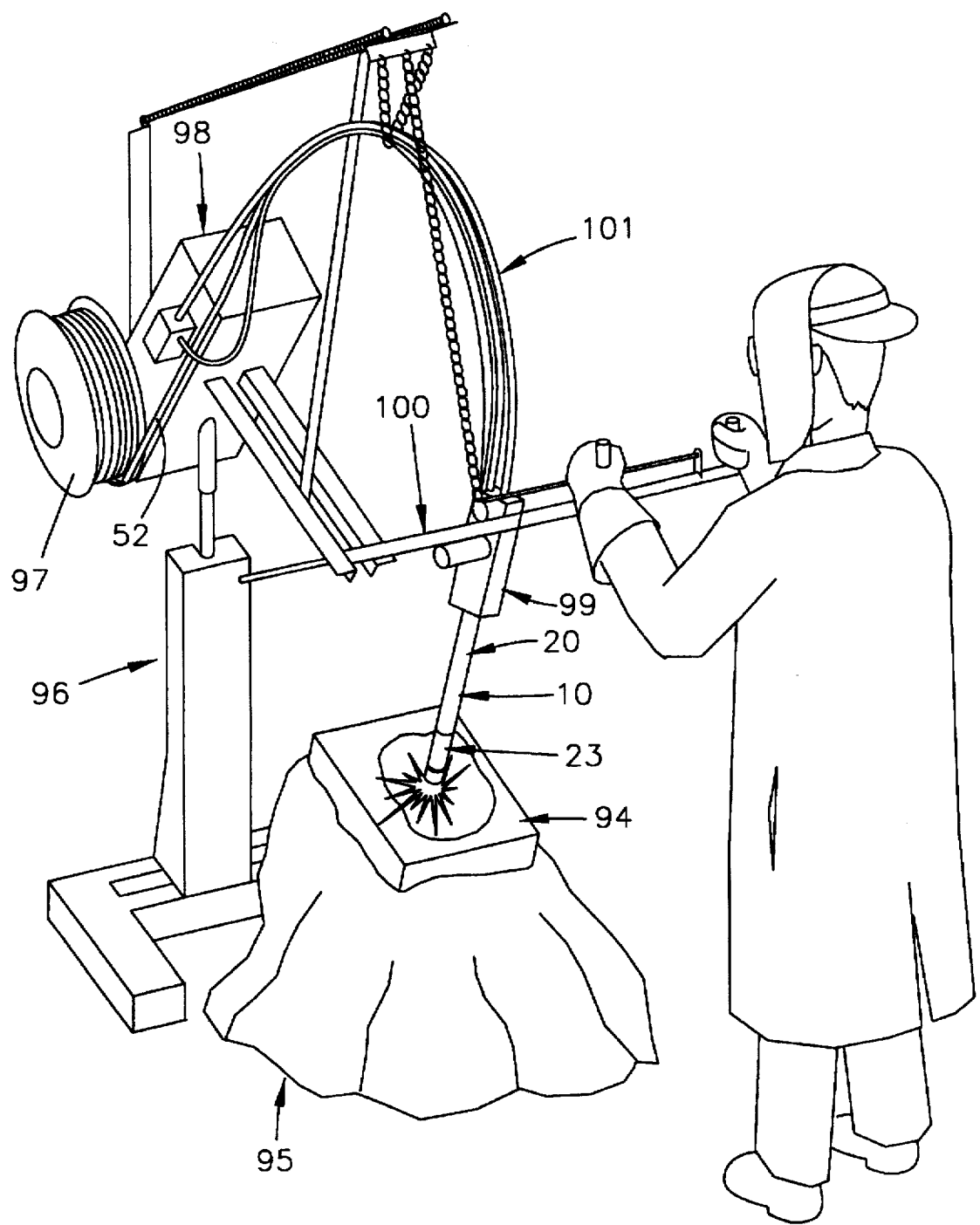
FIG. 1 is a perspective view of a conventional welding apparatus manipulator for use in operating the water cooled gas metal arc welding gun of the present invention.

Referring now to the drawings, and in particular to FIGS. 1 and 8, the numeral 10 generally designates a water cooled gas metal arc welding (MIG) gun made in accordance with the principles of the present invention. It will be understood that the welding gun 10 is used in a vertical position, as illustrated in FIG. 1, and accordingly, the various parts of the welding gun 10 will be referred to as having an upper end and a lower end. As shown in FIG. 3, the welding gun 10 employs a conductive gun barrel structure that includes an inner elongated barrel 11 which comprises a copper tube. As shown in FIG. 3, the upper end 12 of the inner barrel 11 is seated within the tubular lower end or hub 13 of a conductive gun header, generally indicated by the numeral 14. The gun header 14 is made from copper and it is fixedly secured to the upper end 12 of the inner barrel 11 by any suitable means, as by being silver soldered thereto.

The welding gun 10 further includes a water cooled conductive outer barrel 15 which comprises an elongated copper tube. The upper end of the outer barrel 15 is seated around the hub 13 on the gun header 14 and is fixedly secured thereto by any suitable means, as by being silver soldered thereto. The lower end of the outer barrel 16 is seated around the periphery of a cylindrical gas diffuser sleeve, which is generally indicated by the numeral 16. The lower end of the inner barrel 11 is seated against the upper end of the gas diffuser sleeve 16. The inner and outer barrels 11 and 15 are fixedly secured to the gas diffuser sleeve 16 by any suitable means, as by being silver soldered thereto. As illustrated in FIG. 8, the welding gun 10 includes a tubular or cylindrical barrel insulator member, generally indicated by the numeral 20, which is slidably mounted over the outer barrel 15 and which has its upper end seated against the gun header 14. The barrel insulator 20 is fixedly secured in position on the outer barrel 15 by any suitable means as by a press fit. The barrel insulator 20 includes an upper portion 21, and an integral lower portion 22 which has a smaller diameter. The barrel insulator 20 is made from any suitable insulating material, as for example a black "TEFLON" tubing available on the market under No. PL-583.

As shown in FIGS. 5 and 8, the welding gun 10 includes a water cooled copper cup assembly, generally indicated by the numeral 23, which is operatively mounted on the lower end of the gun 10. As shown in FIG. 6, the water cooled copper cup assembly 23 includes an upper cylindrical copper sleeve or tube member 29 which has its lower end fixedly secured around the upper end of a water cooled cup chamber sleeve 26. The water cooled copper cup assembly 23 further includes a lower sleeve or tube member 25 which is mounted around the lower end of the water cooled cup chamber sleeve 26. The lower end of the upper sleeve 24 abuts the upper side of a peripheral shoulder 28 on the water cooled cup chamber sleeve 26. The upper end of the water cooled cup lower sleeve 25 abuts the lower side of the peripheral shoulder 28 on the water cooled cup chamber sleeve 26. The upper sleeve 23 and the lower sleeve 25 are fixedly secured to the water cooled cup chamber sleeve 26 by any suitable means, as by being silver soldered thereto. The water cooled copper cup assembly 23 is slidably mounted over the lower end of the reduced diameter integral portion 22 of the barrel insulator 20 and it is secured thereto by any suitable means as by a press fit. The upper end of the upper sleeve of the water cooled copper cup 23 abuts a shoulder 27 (FIG. 5) formed at the junction point between the larger diameter portion of the barrel insulator upper portion 21 and the barrel insulator lower and smaller diameter portion 22. As shown in FIG. 6, the inner bore 29 in the water cooled copper cup upper sleeve 23 is made to a dimension to slidably receive the lower smaller diameter barrel insulator portion 22.

As shown in FIG. 8, a shielding gas diffuser or nozzle 30 is mounted in the lower end of the gas diffuser sleeve 16. The shielding gas diffuser 30 has a reduced diameter, threaded upper end 31 which is threadably mounted in the threaded lower end of a stepped bore 33 that is formed through the gas diffuser sleeve 16. The shielding gas diffuser 30 has formed therethrough an axial bore 34 which is provided with an internal threaded lower end 35, and in which is threadably mounted the upper threaded end 36 (FIG. 2) of an electrically conductive contact tip 37. As shown in FIG. 8, the shielding gas diffuser 30 and the electrically conductive contact tip 37 are disposed within an axial bore 38 formed through the water cooled copper cup chamber 26 and in a position radially spaced therefrom, to provide a passage for shielding gas emitted by the shielding gas diffuser 30.

Figure 2:
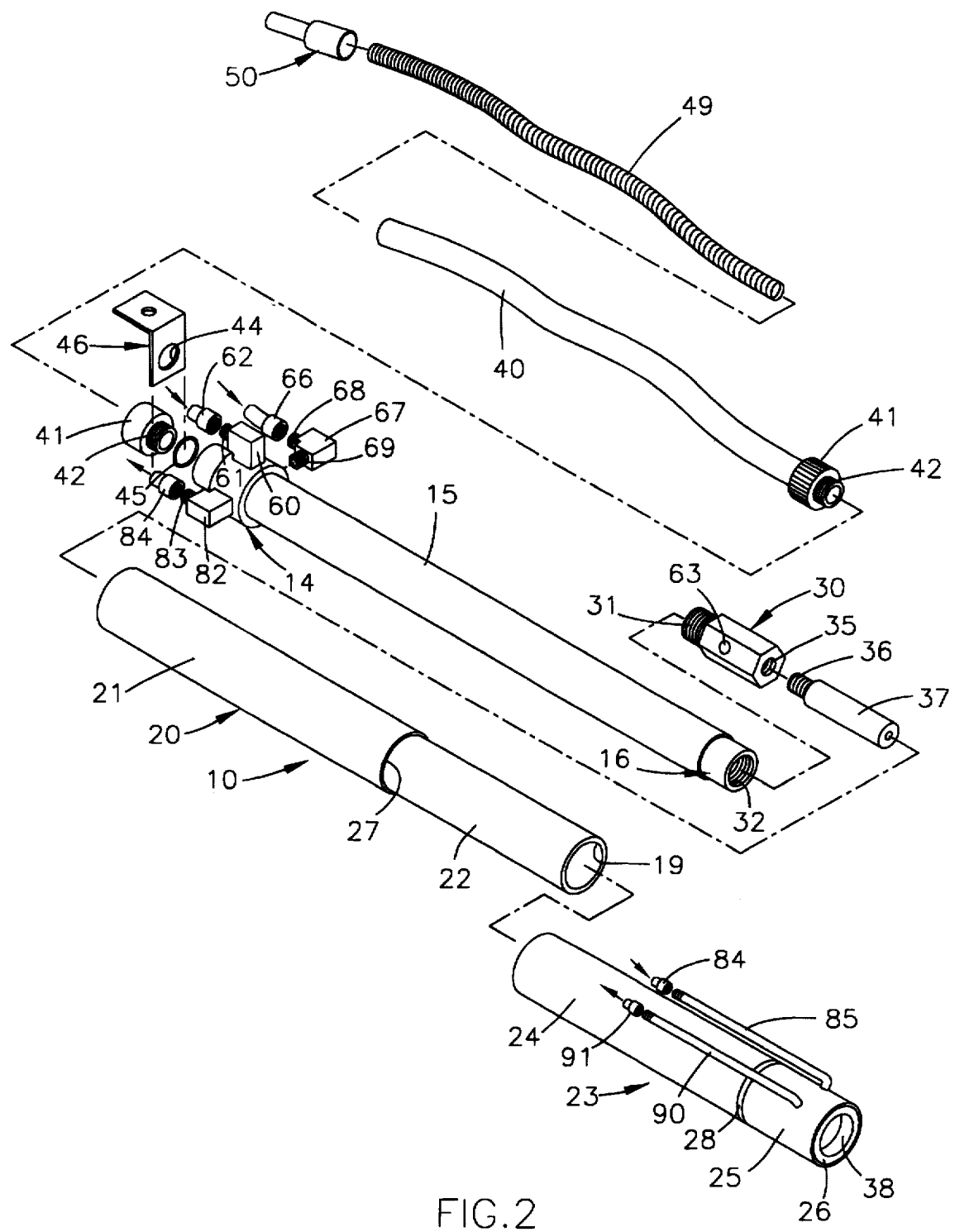
FIG. 2 is an exploded view of the parts of the welding gun of the present invention, and showing the association of the parts relative to each other.

As shown in FIGS. 2 and 8, the numeral 40 designates an elongated flexible elastomeric tubing for conveying a flux-cored welding wire from a wire reel source to the welding gun 10. The tubing 40 has operatively mounted on the leading end thereof, a connector fitting 41 which has a threaded attachment end 42. As shown in FIG. 8, the connector fitting threaded attachment end 42 is mounted through a hole 44 in an electrode lead or power cable lug, generally indicated by the numeral 46, and into threaded engagement in the upper threaded end 47 of an axial bore 48 in the gun header 14. A suitable 0-ring 45 is mounted between the electrode power cable lug 46 and the gun header 14. The cable lug 46 is adapted to have connected thereto a conventional electrode power lead that is connected to a conventional welding machine power source. An elongated coil spring liner 49 is mounted in the tubing 40. The tubing 40 has operatively mounted on the trailing end thereof a suitable fitting 50 for attachment to a flux-cored wire supply reel source. The numeral 52 designates a conventional flux-cored welding wire which is conveyed through the spring liner 49, and it extends downwardly from the lower end of the electrically conductive contact tip 37, as for example, approximately ½ inch, during the operation of the welding gun 10. The flux-cored wire 52 is supplied from a conventional welding wire supply reel. The flux-cored wire 52 is conveyed into the welding gun 10 through the axial bore 48 in the gun header 14, and then through the cylindrical passage 53 in the inner barrel 11, and then through stepped bore 33 of the gas diffuser sleeve 16, and finally through the axial bore 54 in the electrically conductive contact tip 37.

As shown in FIG. 4, the header 14 is provided with a transverse bore 58 that communicates at its inner end with the axial bore 48 in the gun header 14 and which has a threaded outer end 59 for threadably mounting therein a threaded connector outlet of a conventional shielding gas hose gas hose connector fitting 60 (FIG. 2). The gas shielding connector fitting 60 is provided with a threaded inlet end 61 for threaded attachment to the outlet end of a shielding gas hose 62, for supplying an inert shielding gas, as for example argon gas, to the welding gun 10. The shielding gas passes downward through the passage 53 through the inner barrel 11, the stepped bore 33 through the gas diffuser sleeve 16, and into the axial bore in the gas diffuser 30 and out of a plurality of radially disposed gas diffuser ports 63, formed around the periphery of the gas diffuser 30. The gas nozzle or diffuser 30 delivers the shielding gas to the axial bore 38 formed through the water cooled cup chamber sleeve 26 and to the weld area around the electrically conductive contact tip 37 in a smooth and unrestricted manner. The gas diffuser or nozzle 30 is made from copper, since copper is a very good heat conductor, and a copper nozzle resists melting when exposed to the heat generated in a welding operation. The electrically conductive contact tip 37 is also made from copper.

As illustrated in FIG. 2, coolant water is conducted from a suitable source of coolant water by a conventional coolant water inlet hose 66. The coolant water inlet hose 66 is threadably connected to a threaded inlet end 68 of a brass water inlet fitting 67. The water inlet fitting 67 has a threaded outlet pipe 69 which is threadably mounted in the water inlet bore 70 (FIGS. 4, 8) in the gun header 14. As shown in FIGS. 3 and 8, the coolant water entering the gun header 14 flows through the longitudinal inlet passage 71 in the gun header 14 and thence into an elongated water inlet pipe 72, that has its upper end communicating with the water inlet passage 71 in the gun header 14, and its outlet end 74 disposed adjacent the lower end of the inner gun barrel 14, and into the lower or bottom end of the cylindrical space 75 formed between the inner gun barrel 11 and the outer gun barrel 15. As shown in FIG. 8, the coolant water is forced to the bottom cylindrical passage 75, as indicated by the numeral 76, from whence it moves upwardly around the inner barrel 11 to the upper end of the welding gun 10, as indicated by the numeral 77. The coolant water is then conducted through the water outlet passage 80 in the gun header 14, and out a threaded water outlet bore 81 in the gun header 14, and into a brass water outlet fitting 82 (FIG. 2). Threadably connected to the outlet 83 of the fitting 82 is a conventional coolant water hose 84, which is adapted to have its outlet end attached to the inlet end (FIG. 2) of a coolant water inlet tube 85 that is operatively attached to the water cooled copper cup assembly 23. As shown in FIGS. 6 and 8, the coolant water enters the coolant water inlet tube 85, and flows in the direction of the arrow 86 to an outlet end which is fixedly mounted, as by being silver soldered, in a tube opening 87 formed through a water cooled cup lower sleeve or tube 25. The water then flows into a cylindrical hollow water passage 88 that is formed around the axial bore 38 in the water cooled cup chamber sleeve 26. The coolant water then flows around through the cylindrical water passage formed by the cylindrical chamber 88 and out through an opening 89 (FIG. 7) in the water cooled cup lower sleeve 25 and into a coolant water outlet and return tube 90. As illustrated in FIGS. 2 and 5, the coolant water return tube 90 has operatively connected to its upper end a coolant water return hose 91 which returns the coolant water to the source of the coolant water. It will be seen that the aforedescribed water cooling system for the inner gun barrel 11 forces the water to start at the bottom of the elongated water inlet tube 72, which conducts the inlet water down to the area 75 in the lower end of the inlet barrel 11, from whence coolant water flows back upwardly around the inner tube 11 so as to create a flow through the welding gun that does not allow the water to stagnate and heat up. The structure of the water cooled gas cup 23 ensures an optimum coolant water flow, and metal thickness, at the end of the cup, so that physical abuse of the cup 23 does not affect its performance.

In use, the welding gun 10 is disposed in a vertical position, as shown in FIGS. 1, over a workpiece generally indicated by the numeral 94, which is operatively supported on a workpiece stand generally indicated by the numeral 95. The welding gun 10 is operatively supported by a gun support apparatus, generally indicated by the numeral 96. A suitable gun support apparatus is one available on the market from the Weld Mold Company, of 750 Rickett Road, Brighton, Mich. 48116-0298 under the title of "Wire Manipulator". The gun support apparatus 96 is shown schematically in FIG. 1, and it generally includes a wire supply reel or wire spool 97, a control system to control the wire feeding speed of the flux-cored wire 52 and the flow of shielding gas. The numeral 99 generally designates the gun attachment structure employed in the wire manipulator. The numeral 100 generally indicates the gun movement controls employed in the gun support apparatus 96. The numeral 101 generally indicates the gas, flux-cored wire, electrode power lead, and coolant water tubes or lines. The movement of the welding gun 10 is controlled by the operator through the gun movement controls, generally indicated by the numeral 100.

What is claimed is:

1. A water cooled gas metal arc welding gun (10) comprising:

(a) an elongated electrically conductive inner barrel (11), having an upper end and a lower end, and an axial passage (53) formed therethrough;

(b) an elongated electrically conductive outer barrel (15), having an upper end and a lower end, and being telescopically mounted around the inner barrel (11) in a laterally spaced apart position to form a cylindrical longitudinal coolant water passage (75) around the inner barrel (11) which has an upper end and which extends from the upper end of the inner barrel (11) to the lower end of the inner barrel (11);

(c) an electrically conductive header member (14) fixedly secured to the upper ends of the inner (11) and outer (15) barrels, and having an axial bore 48 which communicates with the axial passage (53) through the inner barrel (11);

(d) an electrically conductive shielding gas diffuser sleeve (16), having an upper end and a lower end with the upper end thereof being fixedly secured to the lower ends of the inner (11) and outer (15) barrels, and having an axial bore (33) formed therethrough which communicates with the axial passage (53) formed through the inner barrel (11);

(e) an electrically conductive shielding gas diffuser (30), having an upper end and a lower end, with the upper end thereof being releasably connected to the lower end of the shielding gas diffuser sleeve (16), and having an axial bore formed therethrough which communicate with the axial bore (33) in the shielding gas diffuser sleeve (16) and with a plurality of gas diffuser ports (63) formed radially therein;

(f) an electrically conductive contact tip (37), having an upper end and a lower end, with the upper end thereof being releasably connected to the lower end of the shielding gas diffuser (30), and having an axial bore (54) formed therethrough which communicates with the axial bore formed the shielding gas diffuser (30);

(g) an elongated barrel insulator (20) is mounted around the outer barrel (15), having an upper end and a lower end, and extended longitudinally between the header member (14) and the gas diffuser sleeve (16);

(h) means (40–45,49,50) for conveying welding wire from a welding wire supply source to the header member (14), for passage through the header member axial bore (48), and passage through the inner barrel axial passage (53), the gas diffuser sleeve axial bore (33), the axial bore through the gas diffuser (30) and the axial bore (54) through the electrically conductive contact tip (37);

(i) a tubular water cooled cup assembly (23) mounted around the lower end of the barrel insulator (20), and surrounding the shielding gas diffuser (30) and electrically conductive contact tip (37), and radially spaced apart from the gas diffuser (30) and electrically conductive contact tip (37), and radially spaced apart from the gas diffuser (30) and electrically conductive contact tip (37) to form a discharge passage to permit shielding gas emitted by the shielding gas diffuser (30) to flow downwardly and outwardly over the welding area; and, (j) means (14,66–77,80–84) for supplying pressurized coolant water to the lower end of the cylindrical longitudinal coolant water passage (75) around the inner barrel (11) and for discharging the coolant water from the upper end of the cylindrical longitudinal coolant water passage (75).

2. A water cooled gas metal welding gun (10), as defined in claim 1, wherein, said means for supplying pressurized coolant water to the lower end of the cylindrical longitudinal coolant water passage (75) around the inner barrel (11), and for discharging the coolant water from the upper end of the cylindrical coolant water passage (75) comprises:

(a) an inlet coolant water passage (70,71) formed in the header member (14) which is connected to a pressurized water supply hose (66);

(b) an elongated water inlet pipe (72) mounted in the cylindrical longitudinal coolant water passage (75) and having an upper end (73) in communication with the inlet coolant water passage (70,71) and a lower (74) disposed adjacent the lower end of the inner barrel (11) for discharging the incoming coolant water into the lower end of the cylindrical longitudinal coolant water passage (75); and, (c) an outlet coolant water passage (80,81) formed in the header member (14) which communicates with the upper end of the cylindrical longitudinal coolant water passage (75) to permit water heated during flow through the cylindrical longitudinal coolant water passage (75) to be discharged.

3. A water cooled gas metal welding gun (10), as defined in claim 2, wherein said tubular water cooled cup assembly (23) comprises:

(a) an elongated tubular structure (24,25) having an upper portion (24) mounted around the lower portion (22) of the barrel insulator (20), and a lower portion (25) surrounding the shielding gas diffuser (30) and the electrically conductive contact tip (37);

(b) a sleeve member (26) mounted in said lower portion (25) and constructed to form a cylindrical coolant water passage (88) in said lower portion (25);

(c) a pressurized coolant water inlet tube (85) is connected at one end to said cylindrical coolant water passage (88) in the sleeve member (26) and at another end to a source of pressurized coolant water; and, (d) a coolant water outlet tube (90) is connected to said cylindrical coolant water passage (88) to permit water heated during flow through the cylindrical coolant water passage (88) to be discharged.

4. A water cooled gas metal welding gun (10), as defined in claim 3, wherein:

(a) the outlet coolant water passage (80,81) in the header member (14) is connected by a coolant water inlet hose (84) to the coolant water inlet tube (85) of the water cooled cup assembly (23); and, (b) the coolant water outlet tube (90) of the water cooled cup assembly (23) is connected to a coolant water outlet hose (91) for conveying the coolant water discharged from the cup assembly passage (88) back to a coolant water supply source.

* * * * *